(12) United States Patent
Berzanskis et al.

(10) Patent No.: US 7,539,314 B2
(45) Date of Patent: May 26, 2009

(54) FRAME SYNCHRONIZATION METHOD FOR QKD SYSTEMS

(75) Inventors: Audrius Berzanskis, Cambridge, MA (US); Brandon Kwok, Burlington, MA (US); Harry Vig, North Billerica, MA (US); Jonathan Young, Newburyport, MA (US)

(73) Assignee: MagiQ Technologies, Inc., New York, NY (US)

( * ) Notice: Subject to any disclaimer, the term of this patent is extended or adjusted under 35 U.S.C. 154(b) by 117 days.

(21) Appl. No.: 11/503,774

(22) Filed: Aug. 14, 2006

(65) Prior Publication Data

US 2008/0037790 A1    Feb. 14, 2008

(51) Int. Cl.
*H04L 9/00* (2006.01)
*H04L 9/08* (2006.01)

(52) U.S. Cl. .................. 380/278; 380/255; 380/256; 380/277

(58) Field of Classification Search ............ None
See application file for complete search history.

(56) References Cited

U.S. PATENT DOCUMENTS

| | | | |
|---|---|---|---|
| 3,777,062 A | | 12/1973 | Ogawa |
| 2004/0042498 A1 | | 3/2004 | Furuness et al. |
| 2004/0120528 A1 | * | 6/2004 | Elliott et al. ............. 380/278 |
| 2005/0078827 A1 | * | 4/2005 | Tajima ..................... 380/256 |
| 2005/0190921 A1 | * | 9/2005 | Schlafer et al. .......... 380/278 |
| 2006/0018475 A1 | * | 1/2006 | Vig et al. ................. 380/256 |
| 2006/0098674 A1 | | 5/2006 | Hamasaki et al. |
| 2006/0222180 A1 | * | 10/2006 | Elliott ..................... 380/263 |
| 2007/0009098 A1 | * | 1/2007 | Tanaka et al. ............. 380/30 |
| 2007/0058810 A1 | * | 3/2007 | Tanaka et al. ............ 380/210 |
| 2007/0133798 A1 | * | 6/2007 | Elliott ..................... 380/255 |
| 2008/0013738 A1 | * | 1/2008 | Tajima et al. ............ 380/278 |

OTHER PUBLICATIONS

Pikalo et al, "Parameter estimation and control in a QKD link", Proceedings of SPIE vol. 5436, pp. 21-27, 2004.
Bennett et al, "Experimental Quantum Cryptography", Advances in Cryptology—EUROCRYPT'90, LNCS vol. 473, pp. 253-265, 1991.

* cited by examiner

*Primary Examiner*—Syed A. Zia
(74) *Attorney, Agent, or Firm*—Opticus IP Law PLLC

(57) ABSTRACT

Systems and methods for exchanging and processing encoded quantum signals in quantum key distribution (QKD) systems in real time. A stream of quantum signals is sent from Alice to Bob. Alice only encodes sets or "frames" of the streamed quantum signals based on receiving a "ready" message from Bob. This allows for Bob to finish processing the previous frame of data by allowing different bit buffers to fill and then be used for data processing. This approach results in gaps in between frames wherein quantum signals in the stream are sent unencoded and ignored by Bob. However, those quantum signals that are encoded for the given frame are efficiently processed, which on the whole is better than missing encoded quantum signals because Bob is not ready to receive and process them.

10 Claims, 8 Drawing Sheets

FRAME SYNCHRONIZATION METHOD FOR QKD SYSTEMS

TECHNICAL FIELD OF THE INVENTION

The present invention relates to quantum cryptography, and in particular relates to quantum key distribution (QKD) systems that operate in real time either with or without a general overhead operating system.

BACKGROUND ART

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits introduced errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

QKD systems require synchronization and timing so that the quantum signals sent from one QKD station to the other are properly detected. In particular, the various active elements in the QKD stations, such as the modulators and single-photon detectors (SPDs), are gated to the expected arrival time of the quantum signal. An example QKD system with a synchronization and timing system is described in U.S. Pre-Grant Patent Application Publication Serial No. 2006/0018475, entitled "QKD systems with robust timing" ("the '475 application"), which Application is incorporated by reference herein.

In the QKD system of the '475 Application, quantum signals are received (detected), stored and processed in sets called "frames." This detection, storage and processing requires the coordinated operation of the optics and electronics layers of the QKD system. Frames of qubits are stored in memory buffers sized to each frame, e.g., 8192 qubits per frame. Each qubit memory location M1, M2, . . . M8192 in the frame is associated with a particular quantum signal sent by Alice, e.g., QS-1, QS-2 . . . QS-8192. The frames are arranged "back-to-back" so that when one frame ends another frame immediately begins. This appears to be the most efficient way to receive and process the quantum signals because no quantum signals are dropped between frames. On the other hand, this is possible only in the case when the QKD apparatus is able to process all the data in timely manner.

In many cases, a QKD system employs a computer (such as a personal computer or "PC" or a workstation) running a general-purpose operating system (OS), such as Microsoft WINDOWS XP, DOS, UNIX or Linux, as opposed to a real-time OS, such as those used in certain applications such as navigation systems and the like that require immediate processing of data. Unfortunately, while it is generally more convenient and less expensive to implement a general purpose OS than a real-time OS, the former does not guarantee real-time signal processing without disruption and the possible loss of important data.

SUMMARY OF THE INVENTION

An aspect of the invention is a method of processing quantum signals sent between first and second quantum key distribution (QKD) stations Alice and Bob. The method includes at Alice, grouping the quantum signals into frames and encoding and sending a first frame of encoded quantum signals to Bob, and passing basis and key bit data for each encoded quantum signal of the first frame to a raw-bits (RB) buffer at Alice as Alice's first frame data. The method also includes at Bob, detecting the encoded quantum signals in the first frame and passing detection and measurement basis data for the first frame to a raw-bits (RB) buffer at Bob as Bob's first frame data. The method further includes sending the second and subsequent frames of encoded quantum signals from Alice to Bob while parallel processing data at Alice and Bob from previous frames of encoded quantum signals.

Figure 1:
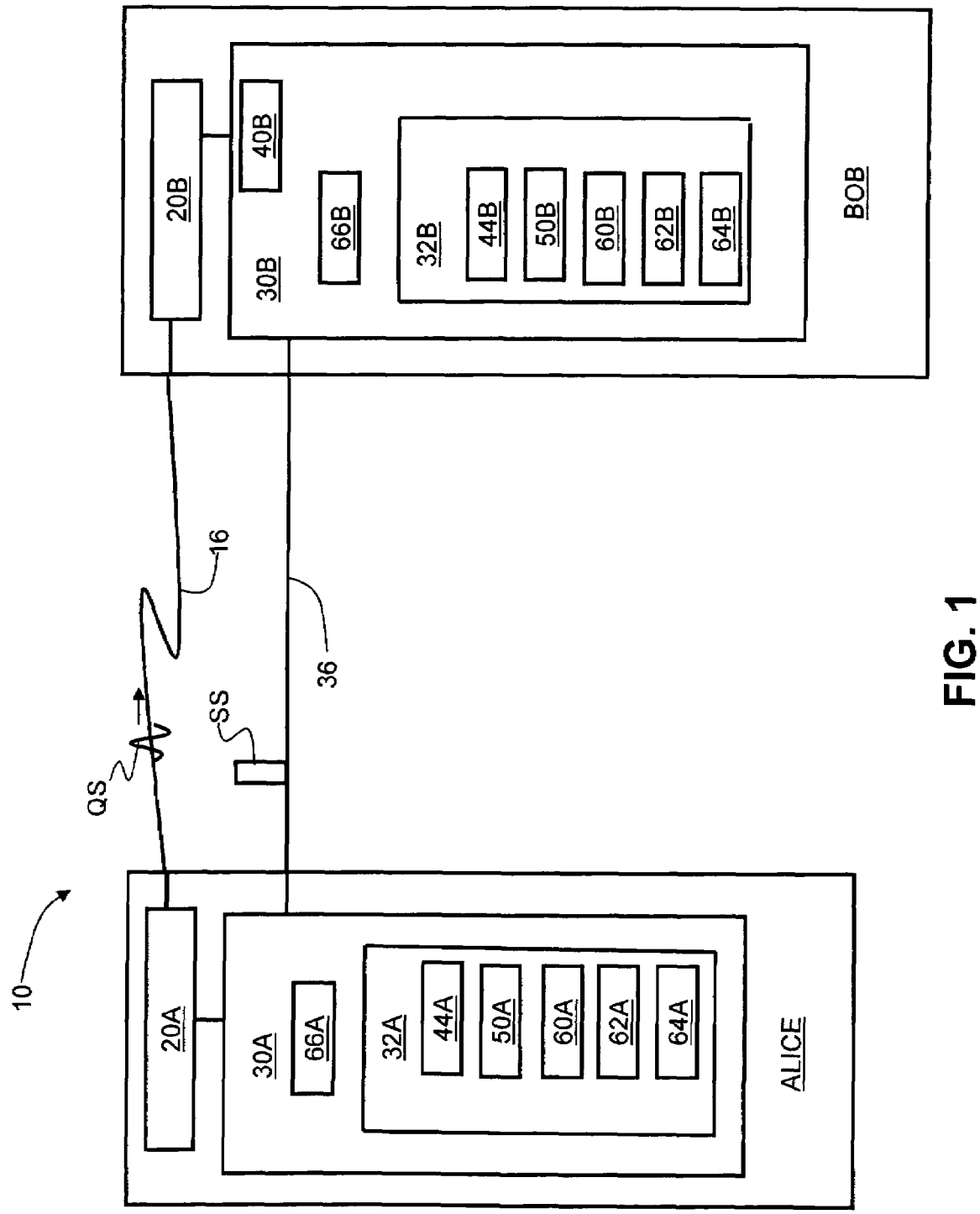
FIG. 1 is a schematic diagram of an example QKD system that supports the frame synchronization method of the present invention.

The various elements depicted in the drawing are merely representational and are not necessarily drawn to scale. Certain sections thereof may be exaggerated, while others may be minimized. The drawing is intended to illustrate an example embodiment of the invention that can be understood and appropriately carried out by those of ordinary skill in the art.

DETAILED DESCRIPTION OF THE INVENTION

The present invention is directed to QKD frame synchronization systems and methods. An example embodiment of the present invention uses frame synchronization as part of the QKD process to optimize QKD system performance when the processing ability of the respective controllers of the QKD stations is limited, e.g., via the use of a general purpose OS rather than a real-time OS. The present invention applies to QKD systems in general, and is neither limited to either a so-called "one-way" or a so-called "two-way" QKD system, nor it is limited to QKD systems that employ a general-purpose operating system.

In the description herein, and in the claims below, the term "buffer size" is sometimes used to describe the number of bits stored in a given buffer, rather than the storage capacity of the buffer per se. The context in which this term is used provides the proper definition.

Also, the term "frame" refers to a set of encoded quantum signals sent from one QKD station to another. The term "frame data" refers to a frame's worth of qubit information—particularly, the basis and bit value data—relating to each encoded quantum signal for a frame of transmitted quantum signals. The term "quantum signal" means either a weak coherent pulse (WCP) of the kind typically used in quantum cryptography, or single-photons from a single-photon source, and is not necessarily encoded. Where the quantum signal is actually encoded (e.g., with basis and key-bit data), the term "encoded quantum signal" is used.

QKD System

FIG. 1 is a schematic diagram of an example QKD system 10 adapted to carry out the frame synchronization method of the present invention. QKD system 10 includes two QKD stations Alice and Bob operably coupled by an optical fiber link 16. Alice and Bob have respective optical layers 20A and 20B each operably coupled to respective electronics/software (E/S) layers 30A and 30B. Optical layers 20A and 20B are optically coupled to one another via optical fiber link 16. Optical layer 20A generates quantum signals QS and optical layer 20B receives and processes the quantum signals. Quantum signals QS can be either encoded or unencoded. Unencoded quantum signals are those that are skipped. In practice, it is most efficient for Alice to continuously generate a stream of quantum signals, though this is not absolutely necessary. The present invention is directed to breaking the stream of quantum signals into groups or "frames" of encoded quantum signals in order to enhance the processing and to more efficiently arrive at establishing quantum keys for each frame of encoded quantum signals.

The E/S layers 30A and 30B control the operation of the corresponding optics layers 20A and 20B, and communicate with each other e.g., via a separate communication link 36, or by being multiplexed together onto optical fiber link 16. In an example embodiment, Alice and Bob send synchronization signals SS over communication link 36 to coordinate the operation of the various active elements of the system. Bob's E/S layer 30B includes a single-photon-detector (SPD) unit 40B adapted to detect quantum signals QS sent from Alice to Bob.

In an example embodiment, E/S layers 30A and 30B respectively include, among other elements, memory units 32A and 32B. These memory units respectively include raw-bits (RB) buffers 44A and 44B that store the bits that make up a raw key, and sifted-bits (SB) buffers 50A and 50B that store the bits that make up a sifted key, as explained below.

Memory units 32A and 32B also respectively include error-correction (EC) buffers 60A and 60B that receive and store error-corrected sifted bits. In an example embodiment, EC buffers 60A and 60B are larger than the SB buffers 50A and 50B. When enough error-corrected bits are transferred to and collected in the EC buffers, they are further processed (e.g., privacy amplified) and in an example embodiment stored in privacy amplification (PA) buffers 62A and 62B and then copied to respective quantum key (QK) buffers 64A and 64B that store the quantum key. Alternatively, the privacy-amplified bits are stored directly in respective quantum key (QK) buffers 64A and 64B.

In an example embodiment, SB buffers 50A and 50B are adapted to hold multiple data frames of raw bit data, namely, the frame data generated locally and that sent to it by the other QKD station. This allows Alice and/or Bob to receive bit data from the other, and then compare and process the data.

In an example embodiment, each E/S layer 30A and 30B includes respective central processing units (CPU) 66A and 66B adapted to carry out logic operations (including, for example, the bit-sifting, bit error-correction and bit privacy amplification steps), and other control functions for the respective QKD stations as well as for the QKD system as a whole. In an example embodiment, E/S layers 30A and 30B may include or are otherwise formed from respective field-programmable gate arrays (FPGAs).

Quantum Key Formation

QKD involves encoding quantum signals QS by randomly selecting measurement bases and bit values (1 or 0). The two main encoding techniques are polarization encoding and phase encoding. In a polarization-encoding scheme, the first of the two measurement bases consists of horizontal and vertical polarization, and the second measurement basis consists of +45° and −45° polarization. The equivalent phase-encoding scheme uses four phase shifts: say, $-3\pi/4$, $-\pi/4$, $\pi/4$ and $3\pi/4$ for the first encoding at Alice's side, and $\pi/4$ and $\pi/4$ phase shifts at Bob's side. For either encoding scheme, bit values of 0 and 1 are assigned to the two measurements in each measurement basis.

For the sake of illustrating the frame synchronization method of the present invention, it is assumed that QKD system 10 uses phase encoding. With reference also to flow diagram 100 of FIG. 2, in 101 Alice and Bob establish a raw key between them. This is accomplished by Alice randomly choosing two bit values (for the basis and the key bit) to encode one of four possible phase shifts on quantum signal QS and sending the encoded quantum signals over to Bob via optical fiber link 16. Alice records the basis and key bit-values of the outgoing quantum signal QS in RB buffer 44A.

Bob chooses a random bit and introduces a corresponding phase shift on each encoded quantum signal QS sent by Alice. This is Bob's "encoding" step. Bob then detects quantum signal QS in his SPD unit 40B. He then records the measurement for each expected quantum signal (photon) time slot in his RB buffer 44B. E/S layers 30A and 30B are adapted to correlate buffer addresses associated with a transmitted quantum signal QS from Alice with an expected arrival time of the quantum signal at Bob.

After Alice and Bob exchange a sufficient number of encoded quantum signals QS, they each have stored in their respective RB buffers 44A and 44B two different versions of a set of raw bits that have corresponding transmitted/measured bases. These raw bits form the raw key.

In 102, Alice and Bob form a sifted key from the raw key. Alice and Bob accomplish this by publicly sharing their measurement bases for each detected encoded quantum signal. Measurements made in the same basis result in perfectly correlated qubits, which are kept, while measurements made in different bases are discarded. In practice, errors arise due to system imperfections, or due to an eavesdropper trying to measure the quantum signals. Accordingly, even after Alice and Bob compare their measurement bases to refine the raw key, they do not yet share exactly the same key. The set of bits remaining after the raw key is processed is called the "sifted key," different versions of which reside in SB buffers 50A and 50B.

Alice and Bob must have (virtually) identical quantum keys in order to use them in a symmetric cryptographic protocol like encryption or authentication. This is accomplished in 103 by transferring sifted bits from SB buffers 50A and 50B to EC buffers 60A and 60B until these buffers are filled, and then in 104 performing "error correction" on the collection of sifted key bits. As mentioned above, the error correction process typically involves executing a complex algorithm with the assistance of CPU units 66A and 66B of corresponding E/S layers 30A and 30B.

One example error-correction algorithm involves dividing the sifted bits held in EC buffers 60A and 60B at Alice and Bob into respective equal-sized "blocks," and then checking the bit parity between the blocks. If there is a parity discrepancy, then one of the blocks has an odd number of errors. In this case, the blocks are divided into sub-blocks, searched recursively, and the error identified and corrected to restore parity. This procedure results in the sub-blocks having either an even number of errors or no errors. Alice and Bob then re-shuffle their bits and repeat the procedure with larger block sizes. However, correcting bits at this larger scale introduces errors in the previously checked sub-blocks. Accordingly, the procedure repeats the smaller-block-size step. This parity-check/error-correction process is repeated until key parity is achieved to within an acceptable error limit.

Figure 2:
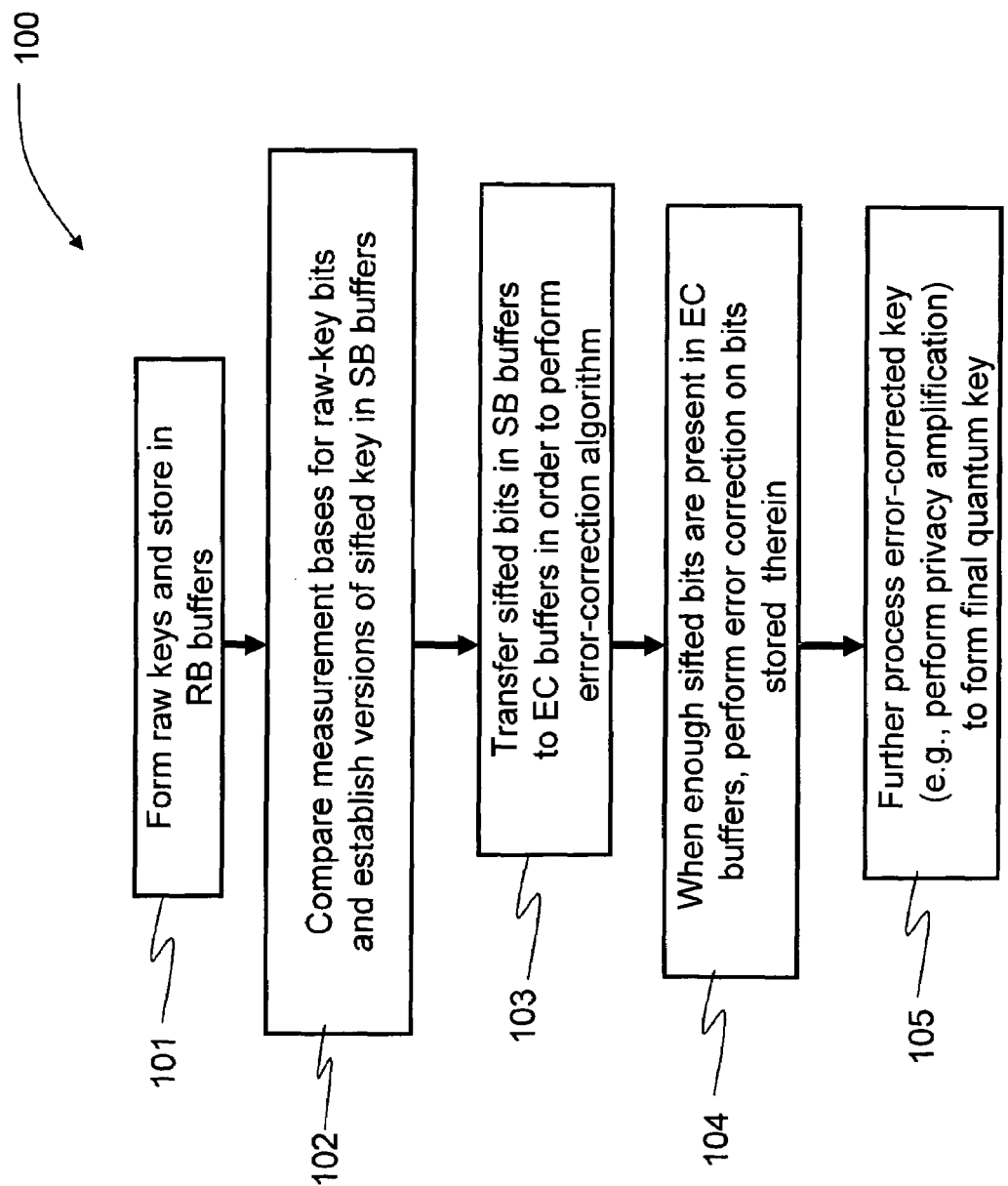
FIG. 2 is a flow diagram of the qubit processing performed by the QKD system of FIG. 1 to generate and store quantum keys.

With continuing reference to flow diagram 100 of FIG. 2, after the error-correction process of 104, the method proceeds to 105, wherein the error-corrected key is then further processed (e.g., undergoes privacy amplification) to obtain a final quantum key shared by both Bob and Alice. The final quantum key, which is stored in QK buffers 64A and 64B, is then can be used in various cryptographic protocols.

Frame Synchronization

Figure 3:
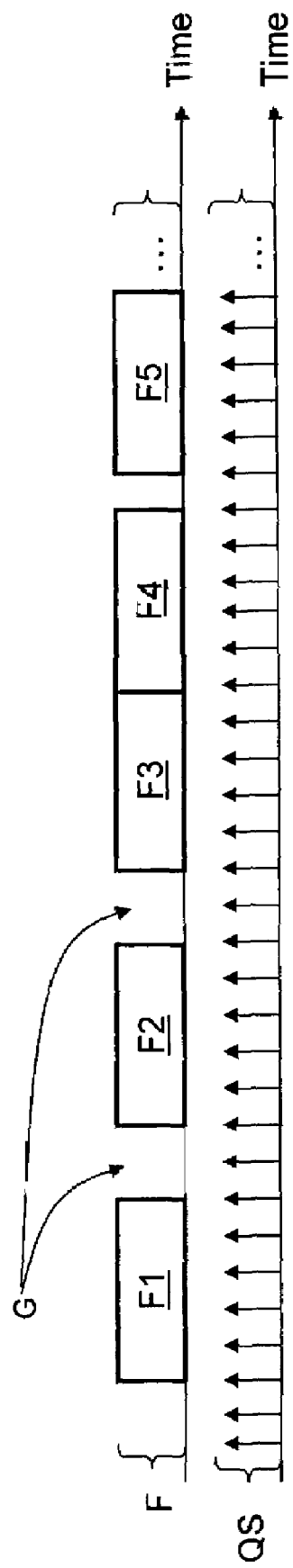
FIG. 3 is a schematic diagram illustrating a stream of quantum signals QS sent by Alice to Bob, and different synchronized frames F (F1, F2, F3, etc.) corresponding to sets of quantum signals.

FIG. 3 is a schematic diagram illustrating a stream of quantum signals QS sent by Alice to Bob, and different frames F (F(1), F(2) ... F(n), F(n+1) ... ) made up of sets of encoded quantum signals. Rather than frames F all being arranged back-to-back, the frames are synchronized with the processing activities carried out at Bob and Alice, such as those described above in connection with flow diagram 100. This means that some of the quantum signals QS in the regular stream of quantum signals generated at Alice are skipped, i.e., they are either sent unencoded or not sent at all and are ignored by Bob. Even though this approach appears at first to reduce the qubit rate of the system, there is actually only minimal loss of data overall since each frame of encoded quantum signals is fully processed. This loss happens only when computational power or communication bandwidth between the Alice and Bob is not high enough to process all qubits. This is in contrast to trying to encode every quantum signal sent by Alice and then missing or incorrectly processing encoded quantum signals, which can lead to errors.

On an optical level, in an example embodiment, the boundary of a given frame F is defined by an optical frame signal (a bit) sent on a sync channel. The bit value 1 means that the corresponding qubit belongs to a frame, while a value 0 means that the qubits should be dropped out by Alice and Bob. There are other possibilities to define a frame, such as by defining a frame start signal and a frame size.

FIGS. 4A, 4B, 5, 6, and 7 are flow diagrams of data read out, sifting, error correction, and privacy amplification processes. These processes run in parallel and start synchronously at the "START" points 200, 300, 400, and 500. At the very beginning, the sifting, error correction, and privacy amplification processes are waiting for the data to fill up the appropriate buffers. The waiting state has to be implemented so that the waiting process (or thread) consumes minimal CPU resources.

Figure 4A:
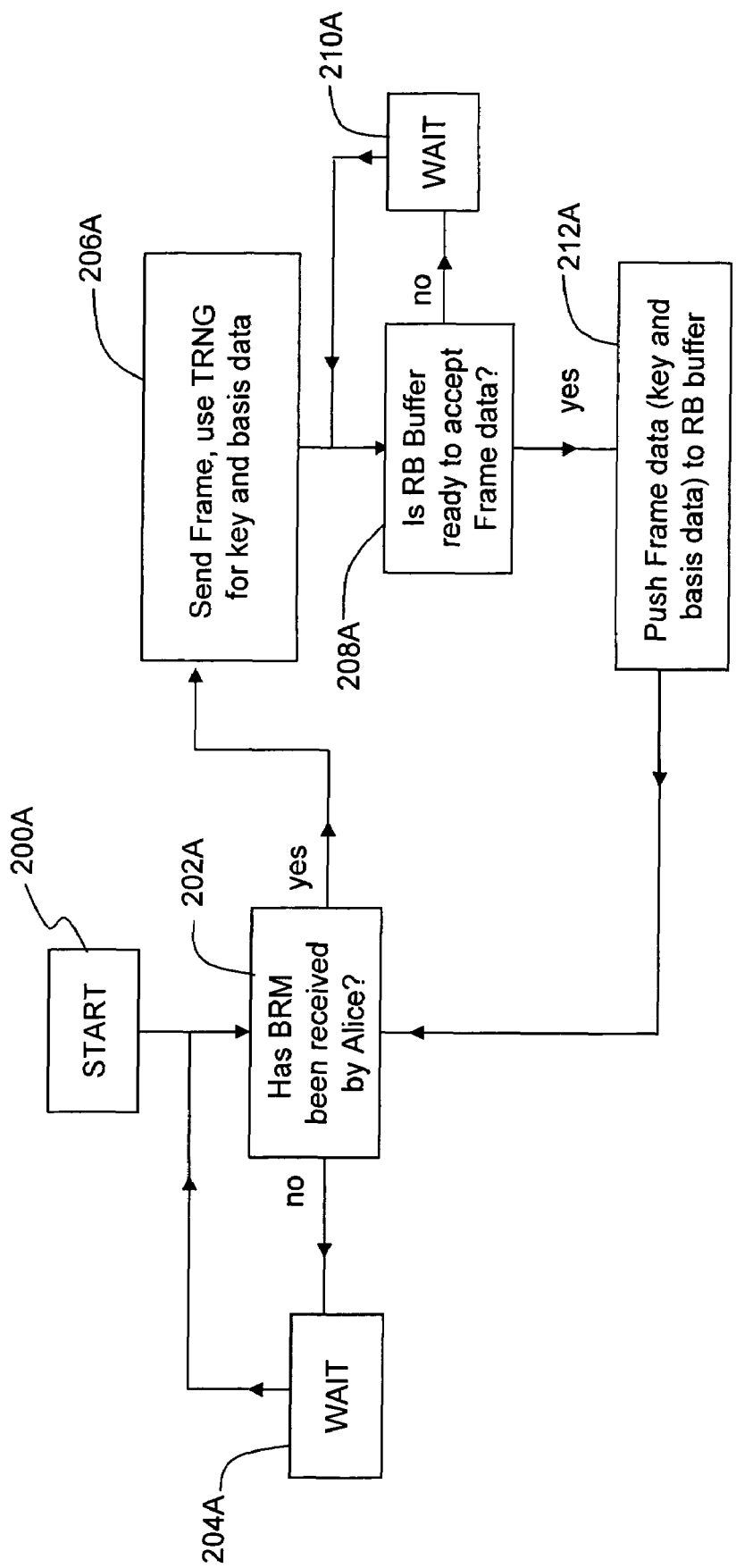
FIG. 4A is a flow diagram of an example embodiment of the quantum signal read-out process as carried out at Alice.
Figure 4B:
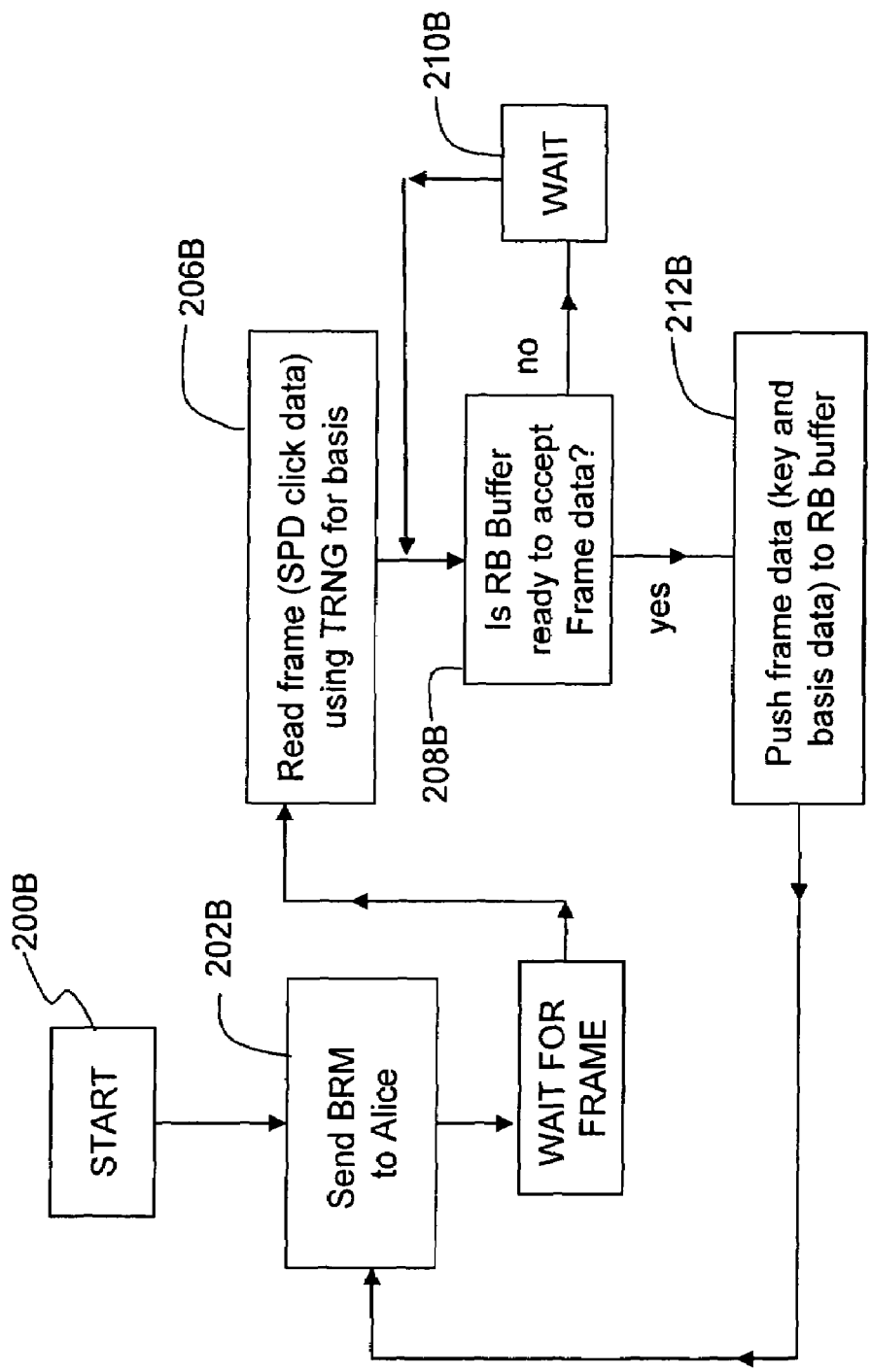
FIG. 4B is a flow diagram of an example embodiment of the quantum signal read-out process as carried out at Bob.

FIGS. 4A and 4B are flow diagrams of the frame synchronization method as carried out at Bob and Alice, respectively. In each "START" box 200A and 200B, E/S layers 30A and 30B communicate via sync signals SS to initiate both the flow of quantum signals from Alice to Bob and the synchronization process. In 202B, Bob sends Alice a "Bob Ready Message" (BRM) signal, and in 204B Bob waits for a frame F from Alice.

The BRM signal can be sent over any existing communication channel between Bob and Alice, such as the public communication channel, the sync channel 36 or the optical fiber link 16 (which may include the sync channel and the public communication channel). It is preferable to use the fastest channel available in order to minimize qubit loss. In current example implementation, Bob sends Alice the BRM signal. However, alternatively, Alice can send Bob a signal that she is ready, and then Bob can start sending out sync signals corresponding to Alice sending the "in frame" data.

At Alice, query box 202A asks whether the BRM signal from Bob has been received. If the answer is "no," then in 204A, Alice waits unit the BRM signal is received. If the answer is "yes," then in 206A Alice sends a frame of encoded quantum signals QS over fiber to Bob. Query box 208A than asks whether RB buffer 44A is ready to accept data. If the answer is "no," then in 210A, Alice waits. If/when the answer is "yes," then in 212A Alice pushes the values of random bits she used for basis and key to her RB buffer 44A.

Note that this example implementation enables Alice to continually send quantum signals QS, so that while Alice is in the waiting state described above, some of the quantum signals she transmits are not included in a frame F, and thus fall into a gap G between frames, as shown in FIG. 3. Other implementations are possible, however, such as Alice not sending any quantum signals QS during the gap (intervals) between frames F.

Meanwhile at Bob, in 206B Bob reads the encoded quantum signals in the frame using true random numbers from a true-random-number generator (TRNG) (e.g., part of CPU 66B) for the measurement basis. Query box 208B asks whether his RB buffer 44B is ready to accept data. If not, then in 210B, Bob waits until his RB buffer is ready. If/when the answer for query box 208B is "yes," in 212B Bob pushes the values for his single-photon detector (SPD) measurements and the true random numbers to his RB buffer 44B. Communicating encoded quantum signals QS in frames F provides a method of bit indexing by providing the frame number and bit position in the frame, which are both the same at Alice and Bob.

After having pushed data to their respective raw bits buffers RB, Alice and Bob are ready for a new frame of encoded quantum signals. Thus, the process at Bob returns to 202B, wherein Bob sends a BRM signal to Alice who is waiting at 202A and 204A, and Alice encodes and sends quantum signals to Bob for the next frame.

Note that both Alice and Bob are doing just minimal preprocessing of their data. This introduces no or only a minimal amount of delay between frames, assuming that the sifting process is removing data from the RB buffers 44A and 44B on average faster than the frame read-out process writes to the RB buffers. This keeps the number of skipped (unencoded) quantum signals to a minimum.

The encoded-quantum-signal transmission and sifting processes are coupled through reading and writing to the RB buffers only. It is thus important to choose a large enough RB buffer to ensure smooth operation without loss of qubits. As a rule of thumb, the RB buffer size should be at least a few times larger than the largest of the frame size or the sifting read block.

Figure 5:
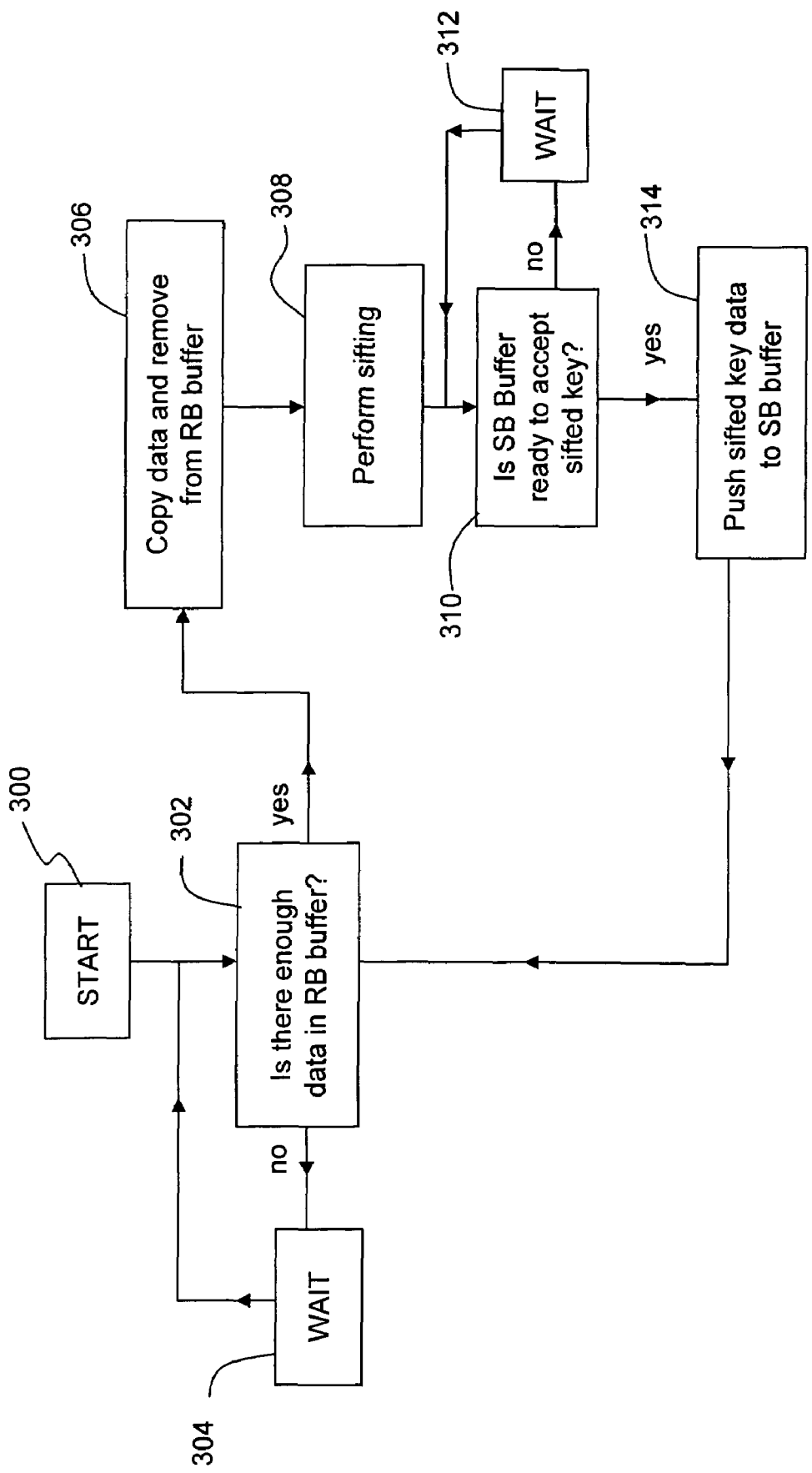
FIG. 5 is a flow diagram of the sifting process as carried out at Alice and at Bob.

FIG. 5 is a flow diagram that describes the sifting process that occurs at both Alice and Bob. The sifting processes are generally identical at Alice and Bob, though the details of implementation may vary.

With reference to the flow diagram of FIG. 5 Alice and Bob need to read data from their RB buffers to start the process of generating the quantum key. Query step 302 asks where there is enough data in the RB buffer for sifting. If the answer is "no," then in 304 Alice or Bob waits until the answer is "yes." At this point, the process proceeds to 306, which involves copying data and removing it from the RB buffer, and then in 308 performing bit sifting on the copied bits.

Query box 310 asks whether the corresponding SB buffer 50A or 50B is ready to accept the sifted key formed in 308. If the answer is "no," then in 312 Alice or Bob waits until the SB buffer is ready. If/when the answer is "yes," then the sifted key (bits) are pushed into the corresponding SB buffer 50A or 50B.

Figure 6:
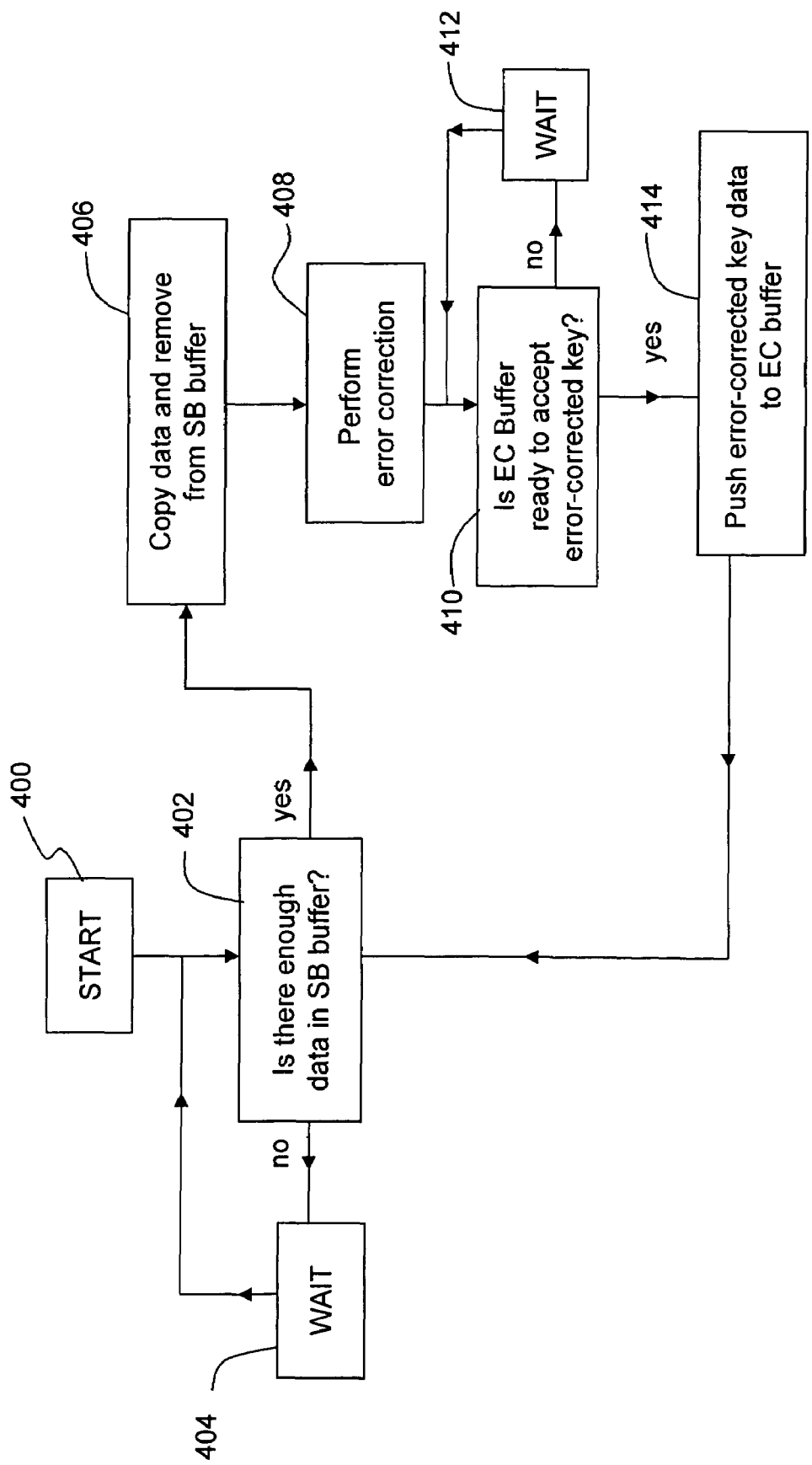
FIG. 6 is a flow diagram of the error-correction process as carried out at Alice and at Bob.

FIG. 6 is a flow diagram that describes the error-correction process that occurs at both Alice and Bob. The error-correction processes are in general identical at Alice and Bob, though the details of implementation may vary at Bob and Alice.

With reference to the flow diagram of FIG. 6, Alice and Bob read the data from their SB buffers. Query step 402 asks where there is enough data in the SB buffer for performing error correction. If the answer is "no," then in 404 Alice or Bob waits until the answer is "yes." At this point, the process proceeds to 406, which involves copying data from the SB buffer and freeing that part of memory in SB and then to 408, which involves performing bit error correction on the sifted bits. Query box 410 asks whether the corresponding EC buffer 60A or 60B is ready to accept the error-corrected key formed in 408. If the answer is "no," then in 412 Alice or Bob waits until the EC buffer is ready. If/when the answer is "yes," then the error-corrected key (bits) are pushed into the corresponding EC buffer 60A or 60B.

Figure 7:
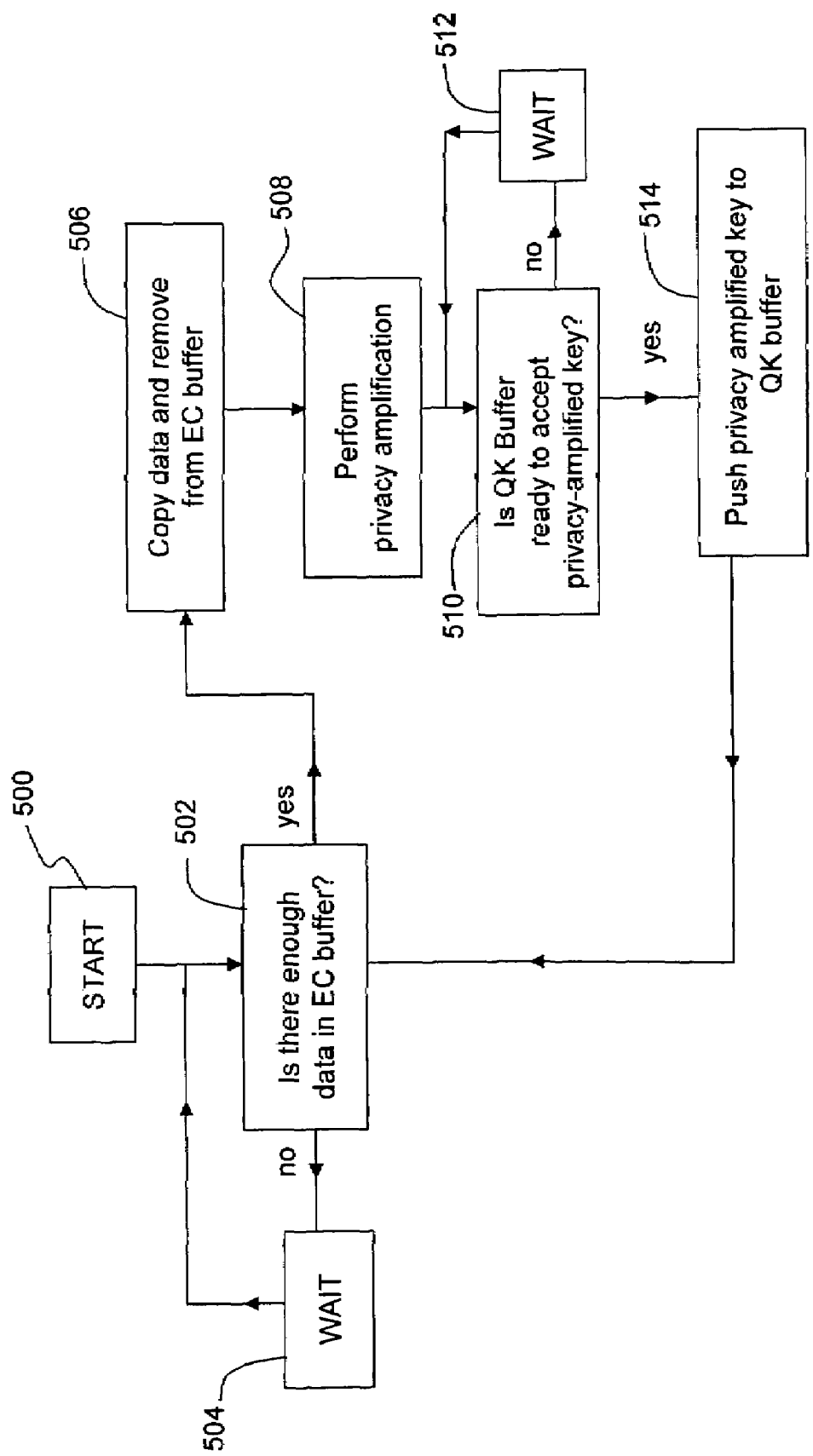
FIG. 7 is a flow diagram of the privacy amplification process as carried out at Alice and at Bob.

FIG. 7 is a flow diagram that describes the privacy amplification process that occurs at both Alice and Bob. The privacy amplification processes are generally identical at Alice and Bob, though the details of implementation may vary at Bob and Alice apparatus.

With reference to the flow diagram of FIG. 7, in 500 Bob and Alice each need to read data from their EC buffers. Query step 502 asks whether there is enough data in the EC buffers to perform privacy amplification. If the answer is "no," then in 504 Alice or Bob waits unit the answer is "yes." At this point, the process proceeds to 506, which involves copying data from the EC buffer and freeing up that part of the EC buffer (memory), and then in 508 performing privacy amplification on the copied EC bits. In the present example, privacy amplified bits are to be stored directly in QK buffers 64A and 64B rather than in PA buffers 62A and 62B. Query box 510 thus asks whether the corresponding QK buffer 64A or 64B (or more generally the next QKD application) is ready to accept the privacy amplified key (bits) formed in 508. If the answer is "no," then in 512 Alice or Bob waits until the QK buffer is ready. If/when the answer is "yes," then the privacy amplified key bits are pushed into the corresponding QK buffer 64A or 64B.

The data processing occurs in parallel. The initial data-read out of the raw bits and bit-sifting process are coupled through the RB buffers, the sifting and error-correction processes are coupled through the SB buffers, and the error correction and privacy amplification processes are coupled through the EC buffers. The data read-out process writes a block of data to the RB buffers, while the sifting process removes a block of data from the RB buffers. In a similar way, the sifting process writes a block of data to the SB buffers while error correction process removes a block of data from the SB buffers, and error correction process writes a block of data to EC buffers while privacy amplification process removes a block of data from the EC buffers. The sizes of the data blocks vary and are determined by the requirements of the QKD protocols.

In an example embodiment, the parameters of the QKD system (frame size, block sizes, and buffer sizes) are optimized in a way that all processes are removing data from appropriate buffers on average faster than the processes are writing to buffers. This ensures that there is no or minimal qubit loss. As a rule of thumb, the buffer sizes should be at least a few times larger than the largest of write or read to the buffer block sizes. In contrast, any of the processes will stop and wait if there is not enough data to read in an appropriate buffer.

Note that the frame synchronization method always adjusts to the maximum data throughput. There will be practically no loss in reading quantum signals QS frame by frame when CPUs 66A and/or 66B is/are able to process data fast enough (assuming that frame sizes are selected properly and the various buffers are sufficiently large) and that the communication speed and the bandwidth between Alice and Bob apparatus are sufficiently large. On the other hand, if the quantum-signal rate is too high (e.g., because the CPUs are too slow or if there is insufficient communication bandwidth), the algorithm will adjust to the maximum possible key generation rate determined by CPU computational power and/or the QKD system communication bandwidth.

While the present invention is described above in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of managing quantum signal transmission in a quantum key distribution (QKD) system having QKD stations Bob and Alice using frame synchronization, comprising:

forming a stream of quantum signals at Alice;
sending a first ready signal from Bob to Alice that defines a start of a first frame of multiple frames each consisting of a set of encoded quantum signals;
performing a first encoding of the quantum signals at Alice and transmitting the first-encoded quantum signals to Bob in the first frame;
performing a second encoding of the first-encoded quantum signals at Bob and detecting the twice-encoded quantum signals at Bob for the first frame;
at Alice, terminating the first encoding of the quantum signals at Alice at the end of the first frame while continuing to form quantum signals that are not included in a subsequent frame;
sending a second ready signal from Bob to Alice to initiate at Alice the first-encoding of quantum signals to form the subsequent frame of encoded quantum signals;

synchronizing the sending of frames of encoded quantum signals from Alice to Bob by sending synchronization signals from Alice to Bob; and performing qubit indexing that assigns a frame number to each frame and a qubit position of each encoded qubit within each frame.

2. A method of transmitting quantum signals between two QKD stations Alice and Bob in a QKD system using frame synchronization to form a quantum key, comprising:

transmitting frames consisting of encoded quantum signals from Alice to Bob only when Bob sends corresponding "ready" signals to Alice, wherein one or more unencoded quantum signals reside between at least one pair of adjacent frames;

during said transmitting, processing data from previous frames in raw-bits (RB) buffers, sifted-bits (SB) buffers, and error-corrected-bits (EC) buffers at Alice and Bob, including copying and processing blocks of bits from each buffer in order to continually free up space in the buffers to prevent or reduce any delays in transmitting frames;

synchronizing the sending of frames of encoded quantum signals from Alice to Bob by sending synchronization signals from Alice to Bob;

performing qubit indexing that assigns a frame number to each frame and a qubit position of each encoded qubit within each frame; and forming a quantum key based on the encoded quantum signals transmitted in the multiple frames.

3. The method of claim 2, including continuously processing and moving bits from the RB buffers to the SB buffers, from the SB buffers to the EC buffers, and from the EC buffers to privacy amplification (PA) buffers while frames are being transmitted from Alice to Bob.

4. The method of claim 1, further comprising:

storing the first and second encodings in respective raw-bits (RB) buffers at Alice and Bob, thereby forming RB buffer data; and parallel processing the RB buffer data by:

i) copying blocks of RB buffer data to perform sifting to fill respective sifted-bit (SB) buffers at Alice and Bob in order to free up space in the RB buffers;

ii) copying blocks of data from the SB buffers to perform error correction to fill respective error-correction (EC) buffers at Alice and Bob in order to free up space in the SB buffers; and iii) copying blocks of data from the EC buffers to perform privacy amplification to form final quantum keys at Alice and Bob.

5. The method of claim 1, further comprising:

storing the first and second encodings as raw bits in raw-bits (RB) buffers at Alice and Bob, respectively, thereby forming RB buffer data; and moving the raw bits from the RB buffers at Alice and Bob as soon as there exists sufficient raw bits for performing key sifting of the raw bits;

performing key sifting on the moved raw bits to form sifted bits; and storing the sifted bits in respective sifted-bits (SB) buffers at Alice and Bob.

6. The method of claim 5, further comprising:

moving sifted bits from the SB buffers at Alice and Bob as soon as there exists a sufficient number of sifted bits to perform error correction;

performing error correction on the sifted bits, thereby forming error-corrected bits; and storing the error-corrected bits in respective error-corrected-bits (EC) buffers at Alice and Bob.

7. The method of claim 6, further comprising:

moving error-corrected bits from the respective EC buffers at Alice and Bob as soon as there exists a sufficient number of error-corrected bits to perform privacy amplification;

performing privacy amplification on the error-corrected bits to form privacy-amplified bits; and storing the privacy-amplified bits in respective privacy-amplified-bits (PA) buffers at Alice and Bob.

8. A method of processing quantum signals sent between first and second quantum key distribution (QKD) stations Alice and Bob, the method comprising:

a) at Alice: i) generating a continuous stream of quantum signals and in response to a ready signal from Bob; ii) initiating encoding of the quantum signals in the continuous stream of quantum signals so as to generate a frame's worth of encoded quantum signals; and ii) passing basis and key bit data for each encoded quantum signal of the first frame to a raw-bits (RB) buffer at Alice as Alice's first frame data;

b) at Bob: i) encoding the encoded quantum signals from Alice to form twice-encoded quantum signals; ii) detecting the twice-encoded quantum signals in the first frame; and iii) passing detection and encoding basis data for the first frame to a raw-bits (RB) buffer at Bob as Bob's first frame data;

c) sending subsequent frames of encoded quantum signals from Alice to Bob in response to corresponding subsequent ready signals sent from Bob to Alice, wherein at least one pair of adjacent frames has one or more unencoded quantum signals therebetween;

d) synchronizing the sending of frames of encoded quantum signals from Alice to Bob by sending synchronization signals from Alice to Bob; and e) performing qubit indexing that assigns a frame number to each frame and a qubit position of each encoded qubit within each frame.

9. The method of claim 8, wherein acts a) and b) constitute a data read-out process, and further comprising:

performing a bit-sifting process on a block of data from the RB buffers and storing resultant sifted bits in respective sifted-bits (SB) buffers at Alice and Bob; and performing an error-correction process on a block of data from the SB buffers and storing resultant error-corrected bits in error-corrected-bits (EC) buffers at Alice and Bob.

10. The method of claim 9, further comprising:

performing a privacy-amplification process on a block of data from the EC buffers and either storing resulting privacy-amplified bits in corresponding quantum key (QK) buffers or directly passing the privacy-amplified bits to a cryptographic application at Alice and Bob.

* * * * *